US010870071B2

(12) United States Patent
Brehm et al.

(10) Patent No.: US 10,870,071 B2
(45) Date of Patent: Dec. 22, 2020

(54) DEFOAMING FORMULATIONS CONTAINING ORGANOPOLYSILOXANES

(71) Applicant: WACKER CHEMIE AG, Munich (DE)

(72) Inventors: Christof Brehm, Burghausen (DE); Willibald Burger, Burghausen (DE); Wolfgang Ziche, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 11 days.

(21) Appl. No.: 16/330,193

(22) PCT Filed: Jun. 6, 2017

(86) PCT No.: PCT/EP2017/063736
§ 371 (c)(1),
(2) Date: Mar. 4, 2019

(87) PCT Pub. No.: WO2018/224131
PCT Pub. Date: Dec. 13, 2018

(65) Prior Publication Data
US 2019/0224591 A1   Jul. 25, 2019

(51) Int. Cl.
| B01D 19/04 | (2006.01) |
| C11D 3/00 | (2006.01) |
| D21H 17/59 | (2006.01) |
| D21H 21/12 | (2006.01) |
| D21C 3/28 | (2006.01) |
| C11D 3/37 | (2006.01) |

(52) U.S. Cl.
CPC ........ B01D 19/0409 (2013.01); C11D 3/0026 (2013.01); C11D 3/373 (2013.01); C11D 3/3734 (2013.01); C11D 3/3738 (2013.01); D21C 3/28 (2013.01); D21H 17/59 (2013.01); D21H 21/12 (2013.01); C08L 2205/035 (2013.01)

(58) Field of Classification Search
CPC .......................... B01D 19/0409; C11D 3/0026
See application file for complete search history.

(56) References Cited

U.S. PATENT DOCUMENTS

| 2,632,736 | A |   | 3/1953 | Currie |
| 3,383,327 | A |   | 5/1968 | Sullivan |
| 3,560,401 | A |   | 2/1971 | O'Hara |
| 4,145,308 | A |   | 3/1979 | Simoneau et al. |
| 4,292,434 | A |   | 9/1981 | Lindner et al. |
| 5,153,258 | A | * | 10/1992 | Nakahara ........... B01D 19/0409 516/117 |
| 6,034,225 | A | * | 3/2000 | Weidner ................. C08G 77/50 534/730 |
| 6,258,913 | B1 |   | 7/2001 | Herzig et al. |
| 6,605,183 | B1 |   | 8/2003 | Rautschek et al. |
| 7,105,581 | B2 |   | 9/2006 | Burger et al. |
| 7,619,043 | B2 | * | 11/2009 | Rautschek ......... B01D 19/0404 516/117 |
| 9,120,035 | B2 |   | 9/2015 | Brehm et al. |
| 2006/0160908 | A1 | * | 7/2006 | Rautschek ............. B01D 19/04 516/123 |
| 2017/0087483 | A1 | * | 3/2017 | Mitra ..................... C11D 3/124 |

FOREIGN PATENT DOCUMENTS

| DE | 2925722 | A1 | 2/1981 |
| DE | 3805661 | A1 | 9/1989 |
| EP | 163541 | A2 | 12/1985 |
| EP | 110370 | B1 | 4/1987 |
| EP | 217501 | A2 | 4/1987 |
| EP | 273448 | A2 | 7/1988 |
| EP | 499364 | A1 | 8/1992 |
| EP | 516109 | A1 | 12/1992 |
| EP | 716870 | A1 | 6/1996 |
| EP | 434060 | B2 | 3/1998 |
| EP | 887097 | A1 | 12/1998 |
| EP | 1060778 | A1 | 12/2000 |
| EP | 1076073 | A1 | 2/2001 |
| EP | 2846891 | B1 | 6/2016 |
| GB | 2257709 | A1 | 1/1993 |
| WO | 11069868 | A2 | 6/2011 |

OTHER PUBLICATIONS

Denkov et al., "Mechanisms of Actions of Mixed Solid—Liquid Antifoams. 1. Dynamics of Foam Film Rupture", Langmuir, 1999, 15, 8514-8529.
Denkov, "Mechanisms of Actions of Mixed Solid—Liquid Antifoams. 2. Stability of Oil Bridges in Foam Films", Langmuir, 1999, 15, 8530-8542.
P. Garrett, The science of defoaming, CRC Press, 2014, Chapter 4.5 "Oil Bridges and antifoam mechanism", p. 152 ff.
Denkov et al., "Mechanisms of Action of Mixed Solid—Liquid Antifoams: 3. Exhaustion and Reactivation", Langmuir, 2000, 16, 2515-2528.
Marinova et al., "Model Studies on the Mechanism of Deactivation (Exhaustion) of Mixed Oil—Silica Antifoams" Langmuir, 2003, 19, 3084-3089.
G. Engelhardt, H. Jancke; J. Organometal. Chem. 28 (1971), 293-300.
Elizabeth A. Williams, Chapter 8—"NMR spectroscopy of organosilicon compounds", The Chemistry of Organic Silicon Compounds, 1989, John Wiley and Sons Ltd, 511-533.

* cited by examiner

Primary Examiner — Marc S Zimmer
(74) Attorney, Agent, or Firm — Brooks Kushman P.C.

(57) ABSTRACT

Defoamer compositions containing a plurality of defined organopolysiloxanes exhibit very short initial foam collapse and yet exhibit long lasting defoaming activity when added to aqueous media prone to foaming.

22 Claims, No Drawings

DEFOAMING FORMULATIONS CONTAINING ORGANOPOLYSILOXANES

CROSS REFERENCE TO RELATED APPLICATIONS

This application is the U.S. National Phase of PCT Appln. No. PCT/EP2017/063736 filed Jun. 6, 2017, the disclosure of which is incorporated in its entirety by reference herein.

BACKGROUND OF THE INVENTION

1. Field of the Invention

The invention relates to defoamer formulations containing organopolysiloxanes and to the use thereof as defoamers, in particular in aqueous surfactant systems.

2. Description of the Related Art

In many liquid, in particular aqueous, systems containing surface-active compounds as desired or else as undesired constituents, foam formation can present problems when these systems are brought into more or less intensive contact with gaseous substances, for example during gassing of wastewaters, during intensive stirring of liquids, in distillation, scrubbing or dyeing processes or in filling procedures.

This foam may be controlled by mechanical means or by addition of defoamers. Siloxane-based defoamers have proven particularly useful.

Improving the performance of siloxane-based defoamers is a constant process. A multiplicity of scientific papers (for example Denkov et al. Langmuir, 1999, 15, 8514, Langmuir, 1999, 15, 8530 or, in summary, P. Garrett, The science of defoaming, CRC Press, 2014, Chapter 4.5 "Oil Bridges and Antifoam Mechanism", v.a. P. 152 ff.) are concerned with the antifoam mechanism and in the case of siloxane-based defoamers the so-called bridging-stretching mechanism is favored. This mechanism is based on the siloxane-based defoamer first forming a bridge in the foam lamella, the tearing apart of which then results in destruction of the foam lamella. A sufficiently low viscosity and also a good spreadability of the defoamer is accordingly necessary in order that a bridge may be formed in the foam lamella.

In the course of the improvement process for the siloxane-based defoamers many papers have focused on increasing the rate of formation of this defoamer bridge and thus on increasing the instantaneous performance (also known as the foam knockdown) of defoamers. The incorporation of hydrophobic fillers, in particular silicas, has achieved marked efficiency enhancements. The incorporation may be effected by distribution of (pre)hydrophobized silica into a polydimethylsiloxane, for example according to DE 29 25 722 A. It is alternatively also possible to carry out an (in situ) hydrophobization, for example by heating of hydrophilic silica distributed in polydimethylsiloxanes, for example according to U.S. Pat. No. 3,383,327 A, or by using basic catalysts (U.S. Pat. No. 3,560,401 A).

A further performance enhancement may be effected when the siloxane-based defoamer contains not only a polydialkylsiloxane and silica but also a copolymer composed of $(CH_3)_3SiO_{1/2}$ and $SiO_2$ building blocks as is described for example in U.S. Pat. No. 4,145,308 A.

A performance enhancement of silicone-based defoamers is likewise possible by addition of polyether-polysiloxane copolymers. U.S. Pat. No. 7,105,581 B1 describes antifoam agents based on polyoxyethylene-polysiloxane copolymers. These added copolymers are surfactants.

Typical silicone-based defoamer compositions may accordingly contain polysiloxanes, fillers such as hydrophobized silicas, copolymers composed of $(CH_3)_3SiO_{1/2}$ and $SiO_2$ building blocks and polyether-polysiloxane copolymers.

The main focus in recent years has been increasing the long-term performance of siloxane-based defoamers. This aspect was investigated in a series of scientific papers (for example Denkov et al., Langmuir, 2000, 16, 2515 or Marinova et al. and Langmuir, 2003, 19, 3084). The loss of performance after a certain use time is therein described as "antifoam exhaustion" or else "antifoam deactivation" and attributed to a series of effects such as for example to a reduction in the particle size of the antifoam globule or to the emulsification of the antifoam agent present on the surface or to the segregation of polydimethylsiloxanes and silica into two different populations of antifoam globules (silica-depleted and silica-enriched).

The use of incipiently crosslinked or in some cases even rubber-like polydimethylsiloxanes as part of a defoamer to impart an elastic moment to the defoamer has been proposed in recent decades to counter these effects and thus enhance long-term performance.

Such incipiently crosslinked or in some cases even rubber-like polydimethylsiloxanes have been produced for example by incorporation of silsesquisiloxane units into the polydimethylsiloxanes (via cohydrolysis) (U.S. Pat. No. 2,632,736 A) by incorporation of an alkoxysilane or a copolymer composed of $(CH_3)_3SiO_{1/2}$ and $SiO_2$ building blocks into the polydimethylsiloxane (via equilibration and/or condensation) (EP 163 541 A2 and EP 217 501 A2) or by free-radical crosslinking of polydimethylsiloxanes (for example DE 3805661 A1 and EP 273 448 A2). The production of incipiently crosslinked and branched siloxanes by reaction of terminally vinyl-containing siloxanes with Si—H-functional siloxanes in the context of a hydrosilylation has been proposed as an alternative (for example EP 434 060 A2, EP 516 109 A1, DE 44 44 175 A1 and GB 2257709 A1).

However, these processes are very unspecific, often exhibit poor reproducibility and frequently afford products which are difficult to handle since they operate near the gel point. These processes are accordingly also performed either in an inert polysiloxane or in the presence of a large excess of one of the reaction partners (generally the vinyl-containing component) as solvent. Intentionally highly crosslinked or even gelled products which, however, are then in turn combined with a relatively large excess of linear polysiloxanes for the sake of handleability have also been produced (for example EP 499 364 A1).

Characterization of the incipiently crosslinked or in some cases even rubberlike polydimethylsiloxanes is often carried out by methods known from elastomer characterization such as for example penetration depth (EP 434 060 A2), the Weißenberg effect (DE 38 050 661) or else rheological characterization. For example in EP 499 364 A1 defoamers are gelled or are gelled in an emulsion and the elastomer property is characterized via the loss factor (tan delta) and the dynamic elasticity modulus (G') at a frequency of 10 Hz and 25° C. and an amplitude of <2%. According to WO 2011/069868 A2 by incorporation of polysiloxanes of very high viscosity (>1 Million mPas) siloxane-based defoamers are imparted with an elastic moment described by the loss factor (tan delta) at 1 Hz and an amplitude of 1%.

The problem addressed was that of providing defoamer formulations based on siloxanes which have a particularly high defoaming performance, in particular a good long-term performance, and are readily handleable.

The problem is solved by the invention.

SUMMARY OF THE INVENTION

The invention provides defoamer formulations containing
(1) organopolysiloxanes containing per molecule
   at least one structural unit of general formula $$O_{1/2}R_2Si\text{—}Y\text{—}SiRO_{2/2} \qquad (I)$$

and at least 2 units of general formula $$R^1R_2SiO_{1/2} \qquad (II)$$

and units of general formula $$R_2SiO_{2/2} \qquad (III)$$

wherein
   R may be identical or different and represents a monovalent SiC-bonded hydrocarbon radical having 1 to 30 carbon atoms which may contain one or more nonadjacent O-atoms and which is free from aliphatic carbon-carbon multiple bonds and
   $R^1$ is R or an alkenyl radical having 2 to 30 carbon atoms, preferably a methyl radical or a vinyl radical, wherein at least one alkenyl radical per molecule is present,
   Y represents a divalent hydrocarbon radical having 2 to 30 carbon atoms,
   with the proviso that the organopolysiloxane contains a structural element of formula $$R_2Y^2SiO\text{—}(SiR_2O)_{x1}\text{—}SiRY^1O\text{—}(SiR_2O)_{x2}\text{—}SiR_2R^1 \qquad (IV),$$

wherein
   R and $R^1$ are as defined above,
   $Y^1$ represents a divalent hydrocarbon radical having 2 to 30 carbon atoms which is bonded to a group having the formula $SiR_2O_{1/2}$,
   $Y^2$ represents a divalent hydrocarbon radical having 2 to 30 carbon atoms which is bonded to a group having the formula $SiRO_{2/2}$, and
   $x_1$ and $x_2$ is 0 or an integer,
   with the proviso that the sum of $x_1+x_2$ is x,
   wherein x is on average more than 5, preferably more than 10, and less than 100, by preference less than 80, preferably less than 60,
(2) fillers and
(3) organopolysiloxane resins composed of units of general formula $$R^2_e(R^3O)_fSiO_{(4-e-f)/2} \qquad (V),$$

wherein
   $R^2$ may be identical or different and represents a hydrogen atom or a monovalent, optionally substituted, SiC-bonded hydrocarbon radical having 1 to 30 carbon atoms,
   $R^3$ may be identical or different and represents a hydrogen atom or a monovalent, optionally substituted hydrocarbon radical having 1 to 4 carbon atoms,
   e is 0, 1, 2 or 3 and
   f is 0, 1, 2, or 3,
   with the proviso that the sum of e+f is not more than 3 and that the sum of e+f is 2 in less than 50% of all units of formula (V) in the organopolysiloxane resin.

DETAILED DESCRIPTION OF THE PREFERRED EMBODIMENTS

In addition to the components just described, defoamer formulations according to the invention may contain as further constituents optionally (4) polyorganosiloxanes of general formula $$R^4R_2SiO(SiR_2O)_mSiR_2R^4 \quad \text{or} \qquad (VIa)$$

$$R_2SiO\text{—}(SiR_2O)_n\text{—}SiR_2O \qquad (VIb)$$

wherein
   R may be identical or different and is as defined above,
   $R^4$ may be identical or different and may be R or $\text{—}OR^5$,
   wherein
   $R^5$ represents a hydrogen atom or a monovalent, optionally substituted hydrocarbon radical having 1 to 25 carbon atoms,
   m is an integer, preferably from 1 to 2500, m is preferably chosen such that the polyorganosiloxanes of formula (VIa) have a viscosity of 10 to 1 000 000 mPas at 25° C. and 101.425 kPa,
   n is an integer, preferably from 2 to 20, n preferably being chosen such that the polyorganosiloxanes of formula (Vb) have a viscosity of 2 to 15 mPas at 25° C. and 101.425 kPa,
   wherein the polyorganosiloxanes may also contain small proportions of branchings, preferably T units ($R^4SiO_{3/2}$) and Q units ($SiO_2$),
optionally
(5) water-insoluble organic compounds,
optionally
(6) polyether-modified polysiloxanes which may be linear or branched and contain at least one polyether group
and optionally
(7) alkaline or acidic catalysts or their reaction products with the components (1) to (6).

The defoamer formulations according to the invention preferably have a loss factor (tan delta) at 100 rad/s between 1.0 and 5.0, more preferably between 1.5 and 3.0, wherein over the considered frequency range of 1 to 100 rad/s the difference in the loss factor (Δ tan delta) is preferably less than 1.5, more preferably less than 1.0,
and the defoamers preferably have a viscosity at 100 rad/s between 1000 mPas and 300,000 mPas, more preferably between 2000 and 100,000 mPas, in each case measured at 25° C., wherein the loss factor and the viscosity are determined according to DIN 53019-4.

It has been found in the course of experiments to increase the efficiency of defoamers—both in terms of knockdown and long-term performance—that, surprisingly, the rheological characterization of a defoamer at a particular frequency is not sufficient to distinguish between efficient and less efficient defoamers. On the contrary the rheological characterization must be carried out over a wide frequency range and comprise both the elastic component (for example consideration of the loss factor (tan delta) and the viscous component (for example viscosity). A possible explanation for this finding is that foam generation and foam destruction are highly dynamic processes, comprise a multiplicity of different processes and also comprise processes having a very wide range of rates (for example draining of the foam lamellae, defoaming processes in the lamella or in the bulk etc.). A defoamer having the highest possible efficiency must ideally also exhibit excellent performance in all processes and both low and high frequencies must therefore be considered. In wide-ranging experiments the frequency range of 1 to 100 rad/s was identified as the optimal condition for characterizing defoamers.

The fact that both the elastic component and the viscous component must be considered over a wide frequency range is explained by the previously mentioned bridging-stretching mechanism. For the greatest possible efficiency the defoamer should also exhibit flowability over the entire frequency range.

If, as is described in the prior art examples of gelled products, flowability is achieved by "dilution" with linear—i.e. non-elastic constituents—this is also transferred to the defoamer efficiency. Particularly at high frequencies (thus in very rapid processes) this will result in an elevation of the loss modulus (tan delta) and thus in a reduction in the elastic property.

The ideal polysiloxane must therefore have a greatest possible density of network junctions or branchings in order that the criterion of a greatest possible elasticity is met and a greatest possible long-term performance thus results.

However, on account of the better handleability this high network junction density must not result in gelation. This results in the criterion of flowability which must be present in order that a bridge may be formed in the foam lamella. Furthermore, these two criteria should also be met at every juncture within the employed defoaming processes: At any juncture there should on the one hand be no gel state (thus no excessively low loss factor (tan delta) but on the other hand also no excessively low elasticity (thus no excessively high loss factor (tan delta). It should therefore exhibit a low loss factor (tan delta) but also a good flowability over the entire frequency range.

A defoamer must therefore ideally comprise as the primary constituent a polysiloxane which meets the above criteria without an inert solvent, such as an inert siloxane, being present or without the polysiloxane having to be produced in the presence of a large excess of one of the reaction partners as solvent.

It has now been found that, surprisingly, the defoamer formulations according to the invention exhibit a particularly high efficiency for aqueous surfactant systems.

The organopolysiloxanes (1) according to the invention are the primary component in the defoamer formulations according to the invention and are therefore present in a greater amount than any further component (2) to (7).

It is preferable when the defoamer formulations contain
(1) at least 30% by weight, more preferably at least 40% by weight, most preferably at least 50% by weight, and preferably not more than 98% by weight, more preferably not more than 90% by weight, and most preferably not more than 85% by weight, of organopolysiloxanes,
(2) at least 1% by weight, preferably at least 2% by weight, more preferably at least 3% by weight, and preferably not more than 15% by weight, more preferably not more than 12% by weight, and most preferably not more than 10% by weight, of fillers,
(3) at least 1% by weight, preferably at least 2% by weight, more preferably at least 3% by weight, and preferably not more than 15% by weight, more preferably not more than 12% by weight, most preferably not more than 10% by weight, of organopolysiloxanes composed of units of formula (V),
(4) at least 0% by weight, preferably at least 3% by weight, more preferably at least 5% by weight, and preferably not more than 40% by weight, more preferably not more than 30% by weight, and most preferably not more than 20% by weight, of polyorganosiloxanes of general formula (VIa) or (VIb),
(5) at least 0% by weight and preferably not more than 15% by weight, more preferably not more than 10% by weight, and most preferably not more than 7.5% by weight, of water-insoluble organic compounds,
(6) at least 0% by weight and preferably not more than 15% by weight, more preferably not more than 10% by weight, most preferably not more than 7.5% by weight, of polyether-modified polysiloxanes which may be linear or branched and bear at least one polyether group and
(7) at least 0% by weight, preferably at least 0.05% by weight, more preferably at least 0.1% by weight, and preferably not more than 1% by weight, more preferably not more than 0.5% by weight, most preferably not more than 0.3% by weight, of alkaline or acidic catalysts or their reaction products with the components (1) to (6).

It is preferable when the defoamer formulations consist of the components (1) to (3) and optionally (4) and optionally (5) and optionally (6) and optionally (7).

It is preferable when the organopolysiloxanes (1) employed in the defoamer formulations are organopolysiloxanes producible when
(A) oligomeric or polymeric organosilicon compounds containing units of general formula

$R^1R_2SiO_{1/2}$ (II), units of general formula

$R_2SiO_{2/2}$ (III), and units of general formula

$HRSiO_{2/2}$ (VII)

wherein
R and $R^1$ are as defined above,
with the proviso that
at least one alkenyl radical $R^1$ per molecule is present, the sum of the units $HRSiO_{2/2}$ and $R^1R_2SiO_{1/2}$ is on average greater than 2.0,
and the number of alkenyl radicals $R^1$ is on average greater than the number of Si-bonded hydrogen atoms
and optionally
(B) oligomeric or polymeric organosilicon compounds containing units of general formula

$R^6R_2SiO_{1/2}$ (VIII) and units of general formula

$R_2SiO_{2/2}$ (III)

wherein
R is as defined above and
$R^6$ is an alkenyl radical having 2 to 30 carbon atoms, preferably a vinyl radical,
are reacted in the presence of
(C) catalysts which promote the addition of Si-bonded hydrogen onto aliphatic double bonds,
wherein the employed ratio of aliphatic double bond in the components (A) and optionally (B) to Si-bonded hydrogen in the component (A) is 1.2 to 10, by preference 1.5 to 5.0, preferably 1.7 to 3.0.

It is preferable when the oligomeric or polymeric organosilicon compounds (A) employed to produce the organopolysiloxanes (1) used in the defoamer formulations are those of formula

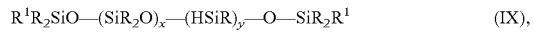

$R^1R_2SiO-(SiR_2O)_x-(HSiR)_y-O-SiR_2R^1$ (IX), wherein
R, R¹ and x are as defined above,
and y is on average at least 0.5, preferably at least 0.6, particularly preferably at least 0.7, and on average not more than 1.5, preferably not more than 1.2 and particularly preferably not more than 1.0,
with the proviso that at least one alkenyl radical R¹ per molecule is present,
the sum of the units $HRSiO_{2/2}$ and $R^1R_2SiO_{1/2}$ is on average greater than 2.0,
and the number of alkenyl radicals R¹ is on average greater than the number of Si-bonded hydrogen atoms.

It is preferable when the oligomeric or polymeric organosilicon compounds (B) optionally employed to produce the organopolysiloxanes (1) used in the defoamer formulations are those of formula $$R^6R_2SiO-(SiR_2O)_z-O-SiR_2R^6 \quad (X),$$

wherein R and R⁶ are as defined above and
z is on average more than 5, preferably more than 10, and less than 1000, preferably less than 500, particularly preferably less than 250.

Examples of hydrocarbons R are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical and the 2-ethylhexyl radical, nonyl radicals such as the n-nonyl radical, decyl radicals such as the n-decyl radical, dodecyl radicals such as the n-dodecyl radical, tetradecyl radicals such as the n-tetradecyl radical, hexadecyl radicals such as the n-hexadecyl radical, and octadecyl radicals such as the n-octadecyl radical; cycloalkyl radicals such as the cyclopentyl, cyclohexyl, cycloheptyl, methylcyclohexyl and 4-ethylcyclohexyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical and the α- and β-phenylethyl radicals.

The hydrocarbon radicals R may contain ether or polyether groups.

Preferred examples of R are methyl, ethyl and phenyl radicals. A particularly preferred example is the methyl radical.

When R¹ has the definition of R, the examples given for R as well as the preferred examples apply to R¹.

When R¹ is an alkenyl radical examples of alkenyl radicals R¹ are the vinyl, allyl, 3-butenyl, 5-hexenyl, 7-octenyl, 9-decenyl and 11-dodecenyl radicals, wherein the vinyl radical and the 5-hexenyl radical are preferred and the vinyl radical is particularly preferred.

It is preferable when the organopolysiloxanes (1) contain on average more than two alkenyl radicals R¹.

It is preferable when Y is a divalent hydrocarbon radical having 1 to 12 carbon atoms, more preferably having 2 carbon atoms, wherein the radical of formula —CH₂CH₂— is particularly preferred.

It is preferable when Y¹ and Y² are in each case a divalent hydrocarbon radical having 1 to 12 carbon atoms, more preferably having 2 carbon atoms, wherein the radical of formula —CH₂CH₂— is particularly preferred.

Examples of Y in the structural unit (I) and of Y¹ and Y² in the structural unit (IV) are those of formula —CH₂CH₂—, —CH(CH₃)—, —(CH₂)₄—, —(CH₂)₅—, —(CH₂)₆—, —(CH₂)₈—, —(CH₂)₁₀—, —(CH₂)₁₂—, wherein the radicals of formula —CH₂CH₂—, —CH(CH₃)—, —(CH₂)₆— and —(CH₂)₈— are preferred and the radical of formula —CH₂CH₂— is particularly preferred.

Y and Y¹ and Y² may also be unsaturated. Examples thereof are radicals of formula —CH=CH— (cis or trans) and —C(=CH₂)—.

In the organopolysiloxanes (1) according to the invention a preferred example of a unit of formula (II) is the trimethyl siloxane unit or the vinyldimethylsiloxane unit, wherein in particular at least one vinyldimethylsiloxane unit per molecule is present.

Preferred examples of units of formula (III) are dimethylsiloxane units.

R² preferably represents a hydrocarbon radical having 1 to 30 carbon atoms.

Examples given for hydrocarbon radicals R apply in their entirety to hydrocarbon radicals R².

Preferred examples of radicals R² are the methyl, ethyl and phenyl radicals.

Examples of radicals R³ are the hydrogen atom and alkyl radicals, such as the methyl, ethyl, n-propyl, isopropyl and n-butyl radicals.

It is preferable when the radical R³ is a hydrogen atom or a methyl or ethyl radical.

Examples of radicals R⁵ are the hydrogen atom and alkyl radicals such as the methyl, ethyl, n-propyl, isopropyl and n-butyl radicals and the isotridecyl, n-octyl, stearyl, 4-ethylhexadecyl, 2-octyl-1-dodecyl or eicosanyl radicals.

It is preferable when the radical R⁵ is a hydrogen atom or a $C_1$-$C_{25}$-alkyl radical, such as a methyl, ethyl or 2-octyl-1-dodecyl radical.

Preferred examples of radicals R⁴ are the methyl, ethyl and phenyl radicals and the hydroxyl, methoxy, ethoxy and 2-octyl-1-dodecyloxy radicals.

Optionally employed polyorganosiloxanes of formula (VIa) where R⁴ is a radical —OR⁵ are obtainable for example by alkaline-catalyzed condensation of silanol-terminated polydimethylsiloxanes and aliphatic alcohols, such as isotridecyl alcohol, n-octanol, stearyl alcohol, 4-ethylhexadecanol, 2-octyl-1-dodecanol or eicosanol.

Examples of radicals R⁶ are the vinyl, allyl, 3-butenyl, 5-hexenyl, 7-octenyl, 9-decenyl and 11-dodecenyl radicals, wherein the vinyl radical and the 5-hexenyl radical are preferred and the vinyl radical is particularly preferred.

The viscosity of the organopolysiloxanes (1) employed in the defoamer formulations according to the invention is preferably at least 50 mPa·s, preferably at least 500 mPa·s, and preferably not more than 10,000 mPa·s, more preferably not more than 5000 mPa·s, in each case at 25° C. and 101.425 kPa.

Organopolysiloxanes (1) may also contain a small amount, preferably 0 to 1 mol %, in particular 0 to 0.02 mol %, based on the sum of all siloxane units, of other siloxane units, such as $RSiO_{3/2}$ (T) units or $SiO_2$ (Q) units (wherein R is as defined above).

Organopolysiloxanes (1) and processes for the production thereof are for example described in U.S. Pat. No. 6,258,913 B1, in particular column 11, line 6 to column 12, line 50 (incorporated by reference).

It is possible to employ one type of organopolysiloxanes (1) or a mixture of at least two types of organopolysiloxanes (1).

In the case of organosilicon compounds (A) used for producing the organopolysiloxanes (1) employed in the defoamer formulation according to the invention, a preferred example of a unit of formula (II) is the trimethyl siloxane unit or the vinyldimethylsiloxane unit, wherein in particular at least one vinyldimethylsiloxane unit per molecule is present.

Preferred examples of units of formula (III) are dimethylsiloxane units.

A preferred example of a unit of formula (VII) is the hydrogenmethylsiloxane unit.

Organosilicon compounds (A), such as those of formula (IX), are for example produced by equilibration of organopolysiloxanes having terminal units of formula $R^1R_2SiO_{1/2}$ with organopolysiloxanes having Si-bonded hydrogen atoms in $HRSiO_{2/2}$ units, wherein R and $R^1$ are as defined above.

The organosilicon compound (A) preferably has a viscosity of 5 to 150 mPas at 25° C.

In the case of the organosilicon compounds (B) optionally used for producing the organopolysiloxanes (1) employed in the defoamer formulations according to the invention a preferred example of a unit of formula (VIII) is the vinyldimethylsiloxane unit.

Preferred examples of units of formula (III) are dimethylsiloxane units.

Organosilicon compounds (B), in particular of formula (X), are known and are produced by equilibration of organopolysiloxanes having terminal units of formula $R^6R_2SiO_{1/2}$ with cyclic organopolysiloxanes or HO— or alkoxy-terminated organopolysiloxanes having units of formula $R_2SiO$, wherein R and $R^6$ are as defined above.

The organosilicon compound (B) preferably has a viscosity of 5 to 100,000 mPas at 25° C.

Employable catalysts (C) which promote the addition of Si-bonded hydrogen onto aliphatic double bonds in the process according to the invention include the same catalysts as previously used for promoting the addition of Si-bonded hydrogen onto aliphatic double bonds.

The catalysts (C) are preferably selected from a metal from the group of platinum metals or a compound or a complex from the group of platinum metals. Examples of such catalysts are metallic and finely divided platinum, which may be on supports, such as silicon dioxide, aluminum oxide or activated carbon; compounds or complexes of platinum, such as platinum halides, for example, $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinyl-siloxane complexes, such as platinum-1,3-divinyl-1,1,3,3-tetramethyldisiloxane complexes with or without a content of detectable inorganically bound halogen, bis(gamma-picoline) platinum dichloride, trimethylenedipyridineplatinum dichloride, dicyclopentadieneplatinum dichloride, dimethylsulfoxideethyleneplatinum(II) dichloride, cyclooctadieneplatinum dichloride, norbornadieneplatinum dichloride, gamma-picoline-platinum dichloride, cyclopentadieneplatinum dichloride, and also reaction products of platinum tetrachloride with olefin and primary amine or secondary amine or primary and secondary amine according to U.S. Pat. No. 4,292,434, such as the reaction product of 1-octene-dissolved platinum tetrachloride with sec-butylamine, or ammonium-platinum complexes according to EP-B 110 370.

The catalyst (C) is preferably used in amounts from 1 to 100 ppmw (parts by weight per million parts by weight), preferably in amounts of 4 to 20 ppmw, in each case calculated as elemental platinum and based on the total weight of the components (A) and optionally (B).

The process for producing the organopolysiloxanes (1) used in the defoamer formulation according to the invention is preferably performed at the pressure of the ambient atmosphere, i.e. at about 1020 hPa (abs.), though it may also be performed at higher or lower pressures.

Moreover, the process is by preference performed at a temperature of 50° C. to 180° C., preferably 60° C. to 140° C.

Inert, organic solvents may be co-used in the production process though co-use of inert, organic solvents is not preferred. Examples of inert, organic solvents are toluene, xylene, octane isomers, butyl acetate, 1,2-dimethoxyethane, tetrahydrofuran and cyclohexane.

The optionally co-used inert organic solvents are subsequently removed by distillation. Highly polymeric products preferably remain dissolved in the inert solvent.

The fillers (2) employed in the defoamer formulations according to the invention preferably have a BET surface area of 20 to 1000 $m^2/g$. The fillers (2) preferably have a particle size of less than 10 μm and an agglomerate size of less than 100 μm.

Examples of fillers (2) are silicon dioxide (silicas), titanium dioxide, aluminum oxide, metal soaps, quartz flour, PTFE powder, fatty acid amides, for example ethylene bisstearamide, and finely divided hydrophobic polyurethanes.

Preferably employed as fillers (2) are silicon dioxide (silicas), titanium dioxide or aluminum oxide having a BET surface area of 20 to 1000 $m^2/g$. These fillers preferably have a particle size of less than 10 μm and an agglomerate size of less than 100 μm.

Preferred as fillers (2) are silicas, in particular those having a BET surface area of 50 to 800 $m^2/g$. These silicas may be pyrogenic or precipitated silicas. Both pretreated silicas, i.e. hydrophobic silicas, and hydrophilic silicas are employable as fillers (2). Examples of commercial hydrophobic silicas that may be employed in accordance with the invention are HDK® H2000, a pyrogenic silica treated with hexamethyldisilazanes and having a BET surface area of 140 $m^2/g$ (commercially available from Wacker-Chemie GmbH, Germany) and a precipitated silica treated with polydimethylsiloxane and having a BET surface area of 90 $m^2/g$ (commercially available under the trade name "Sipernat D10" from Degussa AG, Germany).

Hydrophilic silicas may also be hydrophobized in situ if this is advantageous for the desired performance of the defoamer formulation. Processes for hydrophobizing silicas are well known. The in situ hydrophobizing of the hydrophilic silica may be effected for example by several hours of heating the silica dispersed in the component (1) or (4) or in a mixture of the components (1), (3) and optionally (4) and optionally (5) to temperatures of 100° C. to 200° C. The reaction may be supported by the addition of catalysts, such as KOH, and of hydrophobizing agents, such as short-chain OH-terminated polydimethylsiloxanes, silanes or silazanes.

The component (3) used in the defoamer formulations according to the invention is preferably selected from silicone resins composed of units of formula (V) in which in less than 30%, preferably in less than 5%, of the units in the resin the sum of e+f equals 2.

The organopolysiloxane resins (3) composed of units of formula (V) are preferably
MQ resins composed of units of the formulae $SiO_2$ (Q units) and $R^2_3SiO_{1/2}$ (M units), wherein $R^2$ is as defined above.

The molar ratio of M units to Q units is by preference in the range from 0.5 to 2.0, preferably in the range from 0.6 to 1.0. In addition to the M and Q units the MQ resins may optionally also contain small amounts of $R^2SiO_{3/2}$ or $(R^3O)SiO_{3/2}$ (T) units or $R^2_2SiO_{2/2}$ (D) units, in amounts of by preference 0.01 to 20 mol %, preferably 0.01 to 5 mol %, based on the sum of all siloxane units, wherein $R^3$ is as defined above. These MQ resins may also contain up to 10% by weight of free Si-bonded hydroxyl or alkoxy groups, such as methoxy or ethoxy groups.

These organopolysiloxane resins (3) preferably have a viscosity of greater than 1000 mPa·s or are solids at 25° C. and 101.425 kPa. The weight-average molecular weight determined by gel permeation chromatography (based on a polystyrene standard) of these resins is preferably 200 to 200,000, in particular 1000 to 20,000 g/mol.

Examples of polyorganosiloxanes (4) optionally employed in the defoamer formulations according to the invention are polydimethylsiloxanes of formula (VIa) having a viscosity of 10 to 1,000,000 mPa·s or cyclic polydimethylsiloxanes of formula (VIb) having a viscosity of 2 to 15 mPa·s, in each case at 25° C. and 101.425 kPa.

Though not shown in formula (VI), these polyorganopolysiloxanes (4) may also contain 0 to 1 mol %, preferably 0 to 0.02 mol %, based on the sum of all siloxane units, of other siloxane units, such as $RSiO_{3/2}$ (T) units or $SiO_2$ (Q) units (wherein R is as defined above).

Water-insoluble organic compounds (5) may be employed in the defoamer formulations according to the invention.

In the context of the present invention the term "water-insoluble" is to be understood as meaning a solubility in water at a temperature of 25° C. and a pressure of 101.425 kPa of not more than 3% by weight.

The optionally employed component (5) is preferably selected from water-insoluble organic compounds having a boiling point greater than 100° C. at the pressure of the ambient atmosphere, i.e. at 900 bis 1100 hPa, in particular from mineral oils, native oils, isoparaffins, polyisobutylenes, residues from oxo alcohol synthesis, esters of low molecular weight synthetic carboxylic acids, for example pentanediol-1,3-diisobutyrate, fatty acid esters, for example octyl stearate, dodecyl palmitate or isopropyl myristate, fatty alcohols, ethers of low molecular weight alcohols, phthalates, esters of phosphoric acid and waxes.

Polyether-modified polysiloxanes (6) which may be linear or branched and bear at least one polyether group may be employed in the defoamer formulations according to the invention. Such polyether-modified polysiloxanes are known and described for example in EP 1076073 A1, in particular page 2, line 35 to page 4, line 46 (incorporated by reference).

Examples of alkaline catalysts (7) are alkali metal and alkaline earth metal hydroxides, such as NaOH, KOH, CsOH, LiOH and $Ca(OH)_2$. Examples of acidic catalysts (7) are hydrochloric acid, sulfuric acid and phosphonitrilic chlorides.

The reaction products of (7) with the components (1) to (6) are for example the product of the silica preferred as the filler (2) with alkali metal hydroxides, for example potassium silicate or sodium silicate.

The dosing of the catalysts may be carried out in typical organic solvents such as alcohols (for example methanol, ethanol, isopropanol) or esters (for example ethyl acetate).

The components (2) to (7) employed in the defoamer formulations according to the invention may in each case be one type of such a component or else a mixture of at least two types of a respective component.

The defoamer formulations according to the invention have a viscosity of preferably 100 to 2,000,000 mPa·s, particularly preferably of 10,000 to 80,000 mPa·s, in each case at 25° C. and 101.425 kPa.

The production of the defoamer formulations according to the invention may be carried out by known processes, such as by mixing all components, for example using high shear forces in colloid mills, dissolvers or rotor-stator homogenizers. The mixing procedure may be carried out at reduced pressure to prevent incorporation of air which is present in highly disperse fillers for example. Where required, the in situ hydrophobization of the fillers may follow.

It is also possible to initially charge and optionally heat the components (1) and then successively add the components (2), (3), optionally (4) and optionally (5) and optionally (6) and optionally (7).

In a preferred embodiment component (3) is added in dissolved form as a solution in component (4) or parts of the component (4) or as a solution in component (5) or parts of the component (5).

The invention further provides emulsions containing defoamer formulations according to the invention emulsifiers and water.

When the defoamer formulations according to the invention are emulsions any emulsifiers known to those skilled in the art for producing silicone emulsions, for example nonionic, anionic or cationic emulsifiers, may be employed.

It is preferable to employ emulsifier mixtures and at least one nonionic emulsifier should be present.

Examples (nonlimiting) of employed nonionic emulsifiers are:

1. Alkyl polyglycol ethers, preferably those having 3 to 30 EO units and alkyl radicals of 8 to 20 carbon atoms.
2. Carboxylic acid polyglycol esters, in particular fatty acid polyglycol esters, preferably those having more than 6 EO units and carboxylic acid radicals of 8 to 20 carbon atoms.
3. Ethoxylated or non-ethoxylated sorbitan fatty acid esters.
4. Ethoxylated castor oil or hydrogenated variants.
5. Polyglycerol carboxylic acid esters.
6. Alkyl polyglycosides of general formula $R^*$—O—$Z_o$, wherein $R^*$ represents a linear or branched, saturated or unsaturated alkyl radical having on average 8-24 carbon atoms and $Z_o$ represents an oligoglycoside radical having on average o=1-10 hexose or pentose units or mixtures thereof.
7. Alkyl aryl polyglycol ethers, preferably those having 5 to 30 EO units and 8 to 20 carbon atoms in the alkyl and aryl radicals.
8. Ethylene oxide/propylene oxide(EO/PO) block copolymers, preferably those having 8 to 30 EO/PO units.
9. Polyvinyl alcohol further comprising 5 to 50%, preferably 8 to 20, vinyl acetate units having a degree of polymerization of 500 to 3000.
10. Addition products of alkyl amines having alkyl radicals of 8 to 22 carbon atoms with ethylene oxide or propylene oxide.
11. Natural substances and derivatives thereof, such as lecithin, lanolin, saponins, cellulose; cellulose alkyl ethers and carboxyalkylcelluloses, whose alkyl groups each comprise up to 4 carbon atoms.
12. Polar groups containing in particular linear organo(poly)siloxanes containing in particular the elements O, N, C, S, P, Si, in particular those having alkoxy groups having up to 24 carbon atoms and/or up to 40 EO and/or PO groups.

Preferred nonionic emulsifiers are
1. Alkyl polyglycol ethers, preferably those having 3 to 30 EO units and alkyl radicals of 8 to 20 carbon atoms
such as for example Ceteareth-20, Oleth-10, Oleth-20, Laureth-3, Laureth-4, Laureth-20, Laureth-23, Trideceth-5, Trideceth-6, Trideceth-8, Trideceth-10, Trideceth-12, Trideceth-16, Trideceth-20, Steareth-20 or Steareth-21 (as per INCI).
2. Carboxylic polyglycol esters, in particular fatty acid polyglycol esters, preferably those having more than 6 EO units and carboxylic acid radicals of 8 to 20 carbon atoms, for example PEG-20 Stearate, PEG-20 Laurate, PEG-7 Olivate, PEG-8 Oleate, PEG-8 Laurate HLB PEG-6 Stearate, PEG-20-Stearate or PEG-100 Stearate (as per INCI).
3. Ethoxylated or non-ethoxylated sorbitan fatty acid esters, for example Sorbitan Laurate, Polysorbate 20, Polysorbate 60, Polysorbate 80 or Polysorbate 85 (as per INCI).
4. Ethoxylated castor oil or hydrogenated variants such as for example PEG 200 Castor Oil or PEG-60 hydrogenated Castor Oil (as per INCI nomenclature).
5. Polyglycerol carboxylic acid esters, for example polyglycerol-10 oleate, polyglycerol-10 laurate or polyglycerol-10 stearate.
6. Alkyl polyglycosides of general formula $R^*$—O—$Z_o$, wherein $R^*$ represents a linear or branched, saturated or unsaturated alkyl radical having on average 8-24 carbon atoms and $Z_o$ represents an oligoglycoside radical having on average $o=1$-10 hexose or pentose units or mixtures thereof, for example Glucopon 215, Glucopon 225, Glucopon 600 (trade name).

Examples (nonlimiting) of anionic emulsifiers are:
1. Alkyl sulfates, particularly those having a chain length of 8 to 18 carbon atoms, alkyl and alkaryl ether sulfates having 8 to 18 carbon atoms in the hydrophobic radical and 1 to 30 ethylene oxide (EO)/propylene oxide (PO) units.
2. Sulfonates, particularly alkyl sulfonates having 8 to 18 carbon atoms, alkylaryl sulfonates having 8 to 18 carbon atoms.
3. Alkali metal and ammonium salts of carboxylic acids having 8 to 20 carbon atoms in the alkyl, aryl, alkaryl or aralkyl radical, in particular alkali metal and ammonium salts of fatty acids, preferably those having carboxylic acid radicals of 8 to 20 carbon atoms.

Preferred anionic emulsifiers are alkali metal and ammonium salts of carboxylic acids having 8 to 20 carbon atoms in the alkyl, aryl, alkaryl or aralkyl radical, particularly preferred anionic emulsifiers are alkali metal and ammonium salts of fatty acids, preferably those having carboxylic acid radicals of 8 to 20 carbon atoms, for example sodium salts, potassium salts, trimethylammonium salts of lauric acid, myristic acid, palmitic acid, stearic acid or else oleic acid.

Examples (nonlimiting) of cationic emulsifiers are:
1. Salts of primary, secondary and tertiary fatty amines having 8 to 24 carbon atoms with acetic acid, sulfuric acid, hydrochloric acid and phosphoric acids.
2. Alkylpyridinium, alkylimidazolinium and alkyloxazolinium salts, in particular those whose alkyl chain has up to 18 carbon atoms, specifically the halides, sulfates, phosphates and acetates.
3. Quaternary alkylammonium and alkylbenzeneammonium salts, in particular those whose alkyl groups have 6 to 24 carbon atoms, in particular the halides, sulfates, phosphates and acetates.

It is also possible to add compounds known as thickeners, such as polyacrylic acid, polyacrylates, cellulose ethers such as carboxymethylcellulose and hydroxyethyl cellulose, polyurethanes, natural thickeners, for example xanthan gum, and also preservatives and other customary additives known to those skilled in the art.

However, the continuous phase of the emulsions according to the invention is preferably water. However, it is also possible to produce defoamer formulations according to the invention in the form of emulsions in which the continuous phase is formed by the components (1), (2) and (3) and optionally (4) and optionally (6) and optionally (7) or is formed by component (5).

Multiple emulsions may also be concerned.

Processes for producing silicone emulsions are known. Production is typically effected by simple stirring of all constituents and optionally subsequent homogenizing with jet dispensers, rotor-stator homogenizers, colloid mills or high-pressure homogenizers.

If the composition according to the invention is selected from emulsions, preference is given to oil-in-water emulsions containing
5 to 50% by weight of defoamer formulations according to the invention containing components (1) to (3) and optionally (4) and optionally (5) and optionally (6) and optionally (7), 1% to 20% by weight of emulsifiers and optionally thickeners and
30% to 94% by weight of water.

The compositions according to the invention may also be formulated as free-flowing powders. These are preferred for use in pulverulent washing compositions for example. The production of these powders from the inventive defoamer formulations containing components (1) to (3) and optionally (4) and optionally (5) and optionally (6) and optionally (7) is effected by processes known to those skilled in the art, such as spray drying or buildup granulation and with additives known to those skilled in the art.

The invention further provides powders containing defoamer formulations according to the invention and support materials.

The powders according to the invention preferably contain 2 to 20% by weight of the defoamer formulations according to the invention which contain the components (1) to (3) and optionally (4) and optionally (5) and optionally (6) and optionally (7).

Supports employed are for example zeolites, sodium sulfate, sodium bicarbonate, sodium carbonate, cellulose derivatives, urea and urea derivatives and sugar.

The powders according to the invention contain 80% to 98% by weight of support materials. Further possible constituents of the powders according to the invention are for example waxes or organic polymers as are described in EP-A 887097 and EP-A 1060778 for example.

The defoamer formulations according to the invention and also the emulsions or powders thereof may be employed anywhere where defoamer formulations based on organosilicon compounds have hitherto been employed.

This applies in particular to the control of foam in aqueous surfactant systems, for use in washing and cleaning compositions, for control of foam in wastewater plants, in textile dyeing processes, in natural gas scrubbing, in polymer dispersions and for defoaming of aqueous media generated in chemical pulp production.

The use of the defoamer formulations according to the invention in nonaqueous systems such as in tar distillation or crude oil processing is excluded.

The present invention thus further provides a process for defoaming and/or preventing foaming of media by mixing the defoamer formulations according to the invention or emulsions or powders thereof with the media.

The defoamer formulations according to the invention are preferably used for defoaming and/or for preventing foaming in aqueous media generated in chemical pulp production.

The defoamer formulations according to the invention may moreover be employed in washing and cleaning compositions and care compositions, for example fabric conditioner, wherein the defoamer formulations according to the invention may be used as such or in the form of emulsions or powders.

The present invention thus further provides washing and cleaning compositions containing the inventive defoamer formulations or the inventive defoamer formulations in the form of emulsions or in the form of powders.

The addition of the defoamer formulations according to the invention to the foaming media may be effected directly, dissolved in suitable solvents, such as toluene, xylene, methyl ethyl ketone or tert-butanol, as a powder or as an emulsion. The amount necessary to achieve the desired defoamer performance depends for example on the nature of the medium, the temperature and the turbulence that occurs.

The defoamer formulations according to the invention are preferably added to the foaming medium in amounts of 0.1 ppmw to 1% by weight, in particular in amounts of 1 to 100 ppmw, based on the total weight of the medium to be defoamed.

It has been found that, surprisingly, the performance and handleability of the defoamer formulations according to the invention is substantially improved by the process according to the invention. The defoamer formulations according to the invention in particular feature a very good handleability and dosability and also a high performance in respect of both instantaneous foam collapse and long-term performance.

The defoamer formulations according to the invention have the advantage that they feature a high, long-lasting performance in a very wide range of media at low addition amounts. This is exceptionally advantageous both economically and ecologically.

In the examples which follow, all parts and percentages are by weight, unless otherwise stated. The examples which follow, unless otherwise stated, are carried out at a pressure of the ambient atmosphere, i.e. at about 1000hPa, and at room temperature, i.e. about 20° C. or a temperature which is established as a result of adding the reactants together at room temperature without additional heating or cooling.

Dynamic viscosities were measured using an Anton Paar "MCR 302" rheometer according to DIN EN ISO 3219: 1994 and DIN 53019, using a cone-plate system (cone CP50-2) having a 2° opening angle. The instrument was calibrated with Normalol 10000 from the National Metrology Institute. The temperature of measurement is 25.00° C.+/−0.05° C. and the measurement time is 3 min. The reported viscosity (reported in mPas) is the arithmetic average of three independently performed individual measurements. The uncertainty in the dynamic viscosity measurement is 1.5%. The shear rate gradient was chosen according to the viscosity and is reported separately for each reported viscosity.

Kinematic viscosities are determined by means of a ViscoSystem® AVS 350 viscosity measuring system from Schott using Ubbelohde viscometer tubes having a constant (from Windaus or VWR for example) according to DIN 51562-part 1 or ISO/DIS 3105 (including calibration thereof). The measurements are carried out at a temperature of 25.0° C. (+−0.1° C.). The reported viscosity (reported in mm$^2$/s) is the arithmetic average of three independently performed individual measurements: The uncertainty in the kinematic viscosity is 1.05%. Depending on the range of measurement different viscometer tubes having corresponding directional constants are used.

| Range of measurement | Capillary number | Directional constant |
|---|---|---|
| 0.5-3 mm$^2$/s | 0c | 0.003K |
| 0.8-5 mm$^2$/s | 0a | 0.005K |
| 1.2-10 mm$^2$/s | I | 0.01K |
| 3-30 mm$^2$/s | Ic | 0.03K |
| 10-100 mm$^2$/s | II | 0.10K |
| 30-300 mm$^2$/s | IIc | 0.30K |
| 100-1000 mm$^2$/s | III | 1K |
| 300-3000 mm$^2$/s | IIIc | 3K |
| 1000-10000 mm$^2$/s | IV | 10K |

Reported range of measurement, corresponding capillary number and constant are as per VWR-Laborkatalog, 2011-2013, p 645.8.

$^1$H-NMR-spectra are recorded as a solution in CDCl$_3$ in a Bruker Avance III HD NMR spectrometer (5 mm broadband probe with ATMA and Z-gradient) at a measuring frequency of 500.13 MHz.

$^{29}$Si-NMR-spectra are recorded as a solution in C$_6$D$_6$-toluene in a Bruker Avance III HD NMR spectrometer (5 mm broadband probe with ATMA and Z-gradient) at a measuring frequency of 90.34 MHz.

Evaluation is carried out as is known to those skilled in the art and described in the following literature: "Über die $^1$H-, $^{13}$C- und $^{29}$Si-NMR chemischen Verschiebungen einiger linearer, verzweigter und cyclischer Methyl-Siloxan-Verbindungen", G. Engelhardt, H. Jancke; J. Organometal. Chem. 28 (1971), 293-300; "Chapter 8—NMR spectroscopy of organosilicon compounds", Elizabeth A. Williams, The Chemistry of Organic Silicon Compounds, 1989 John Wiley and Sons Ltd, 511-533.

The Wijs iodine number determination is carried out according to 53241-1:1995-05. The iodine number is defined by the amount in grams of iodine which is bound by 100 g of substance. The iodination of the double bonds present in the substance and back titration with sodium thiosulfate solution of the unconsumed iodine affords a metric for the extent of the olefin content; it must be noted that the determination also captures the hydrogen bonded to silicon.

Examples 1

Production of the Organosilicon Compounds (A):
a) Organosilicon Compound A1:

In a 500 mL three-necked flask 101.0 g of an equilibrate of dimethylsiloxy and vinyldimethylsiloxy units having an iodine number of 22.0 with 2.7 g of a hydrolyzate of hydrogenmethyldichlorosilane terminated with trimethylsiloxy units and having a chain length of about 55 Si units, 120.0 g of an OH-terminated polydimethylsiloxane having a viscosity of 62 mm$^2$/s (25.0° C.; capillary no. II) and 28.6 g of an equilibrate of dimethylsiloxy and trimethylsiloxane units having a viscosity of 35 mm2/s (25.0° C.; capillary no. II) are equilibrated for two hours with 250 ppm of PNCl$_2$ at 120° C. and a reduced pressure of 20 mbar. The catalyst is deactivated by addition of NaHCO$_3$. After filtration and removal of volatile constituents at 160° C. and a reduced pressure of 40 mbar a polysiloxane A1 having a viscosity of 81 mm²/s (25.0° C.; capillary no. II), an iodine number of 13.3 and an H content of 0.016% by weight is obtained. The ²⁹Si-NMR determination reveals a content of dimethylsiloxy units (corresponds to index x) of 52.

b) Organosilicon Compound A2:

In a 4 liter three-necked flask 197 g of 1,3-divinyltetramethyldisiloxane with 75 g of a hydrolyzate of hydrogenmethyldichlorosilane terminated with trimethylsiloxy units and having a chain length of about 55 Si units, 2745 g of octamethylcyclotetrasiloxane and 55 g of hexamethyldisiloxane are equilibrated for 2.5 hours with 200 ppm of $PNCl_2$ at 120° C. The catalyst is deactivated by addition of MgO. After filtration and removal of volatile constituents at 135° C. and a reduced pressure of 10 mbar a polysiloxane A2 having a viscosity of 23 mm²/s (25.0° C.; capillary no. II), an iodine number of 26.6 and an H content of 0.038% by weight is obtained. The ²⁹Si-NMR determination reveals a content of dimethylsiloxy units (corresponds to index x) of 26.

c) Organosilicon Compound A3:

In a 1000 mL three-necked flask 497.4 g of an equilibrate of dimethylsiloxy and vinyldimethylsiloxy units having an iodine number of 24.7 with 17.1 g of a hydrolyzate of hydrogenmethyldichlorosilane terminated with trimethylsiloxy units and having a chain length of about 55 Si units, 192.0 g of an equilibrate of dimethylsiloxy and trimethylsiloxane units having a viscosity of 34 mm2/s (25.0° C.; capillary no. II) are equilibrated for two hours with 200 ppm of $PNCl_2$ at 120° C. and a reduced pressure of 20 mbar. The catalyst is deactivated by addition of MgO. After filtration a polysiloxane A3 having a viscosity of 24 mm²/s (25.0° C.; capillary no. II), an iodine number of 25.7 and an H content of 0.037% by weight is obtained. Volatile constituents remain in the product. For analytical purposes a small amount of the obtained product was freed from volatile constituents at 135° C. and a reduced pressure of 10 mbar. The ²⁹Si-NMR determination of this analytical sample reveals a content of dimethylsiloxy units (corresponds to index x) of 27.

d) Organosilicon Compound VA4:

In a 1000 mL three-necked flask 164.0 g of an equilibrate of dimethylsiloxy and vinyldimethylsiloxy units having an iodine number of 25.0 with 4.8 g of a hydrolyzate of hydrogenmethyldichlorosilane terminated with trimethylsiloxy units and having a chain length of about 55 Si units, 676.0 g of octamethylcyclotetrasiloxane and 46.5 g of an equilibrate of dimethylsiloxy and trimethylsiloxane units having a viscosity of 34 mm2/s²/s (25.0° C.; capillary no. II) are equilibrated for two hours with 250 ppm of $PNCl_2$ at 120° C. The catalyst is deactivated by addition of MgO. After filtration a polysiloxane VA4 having a viscosity of 163 mm²/s (25.0° C.; capillary no. IIc), an iodine number of 4.6 and an H content of 0.008% by weight is obtained. Volatile constituents remain in the product. For analytical purposes a small amount of the obtained product was freed from volatile constituents at 135° C. and a reduced pressure of 10 mbar. The ²⁹Si-NMR determination of this analytical sample reveals a content of dimethylsiloxy units (corresponds to index x) of 117.

Examples 2

Production of the Organopolysiloxanes (1):

a) Organopolysiloxane (1-1):

In a 250 ml three-necked flask 100.0 g of the polysiloxane A1 dissolved in 50 ml of xylene together with 0.2 g of a toluenic solution of Karstedt's Pt catalyst (Pt content: 0.3% by weight) is heated to 90° C. for 3.5 h. During the final cooling 0.3 g of diallyl maleate are added. Xylene is removed at 90° C. and under a reduced pressure of 32 mbar. A polysiloxane (1-1) having a viscosity of 425 mPas (measured at 25° C. and a shear rate of 1 l/s) is obtained.

Production of organopolysiloxane (1-1) thus employs exclusively polysiloxane A1 and the predominant component is therefore structural element (IV) where x=52. (1-1) is in the form of a flowable compound not inclined to gelling. It is thus not necessary to use an inert solvent.

b) Organopolysiloxane (1-2):

In a 250 mL three-necked flask 100.0 g of the polysiloxane A2 together with 55.0 g of a linear vinyldimethylsilyl-terminated polydimethylsiloxane having an iodine number of 1.99 together with 0.08 g of a solution of Karstedt's Pt catalyst in linear vinyldimethylsiloxane-terminated polydimethylsiloxane (Pt content: 1.0% by weight) are slowly heated to 135° C. and held at this temperature for one hour. An organopolysiloxane (1-2) having a viscosity of 2020 mPas (measured at 25° C. and a shear rate of 1 l/s) is obtained after cooling.

Production of organopolysiloxane (1-2) employs polysiloxane A2 in a large excess and structural element (IV) where x=26 is therefore present to a predominant extent. The ratio of vinyl to Si—H is 2.37. The linear vinyldimethylsilyl-terminated polydimethylsiloxane (component (B)) has thus been incorporated by reaction to a predominant extent and is therefore present in a minimal excess. Nevertheless, (1-2) is in the form of a flowable compound not inclined to gelling.

c) Organopolysiloxane (1-3):

In a 500 mL three-necked flask 150.0 g of the polysiloxane A3 together with 30.0 g of an equilibrate of dimethylsiloxy and vinyldimethylsiloxy units having an iodine number of 6.6 together with 0.09 g of a solution of Karstedt's Pt catalyst in linear vinyldimethylsilyl-terminated polydimethylsiloxane (Pt content: 1.0% by weight) are slowly heated to 90° C. and held at this temperature for two hours. After cooling, volatile constituents are removed at 130° C. and a reduced pressure of 10 mbar to obtain an organopolysiloxane (1-3) having a viscosity of 1692 mPas (measured at 25° C. and a shear rate of 1 l/s).

Production of organopolysiloxane (1-3) also employs polysiloxane A3 in a large excess and structural element (IV) where x=27 therefore is present to a predominant extent. The ratio of vinyl to Si—H is 1.87. The linear vinyldimethylsilyl-terminated polydimethylsiloxane (component (B)) has thus been incorporated by reaction to a predominant extent and is therefore likewise present in a minimal excess. Nevertheless, (1-3) is in the form of a flowable compound not inclined to gelling.

d) Organopolysiloxane V(1-4) (Noninventive):

In a 500 mL three-necked flask 180.0 g of the polysiloxane A4 together with 36.0 g of an equilibrate of dimethylsiloxy and vinyldimethylsiloxy units having an iodine number of 6.6 together with 0.09 g of a solution of Karstedt's Pt catalyst in linear vinyldimethylsilyl-terminated polydimethylsiloxane (Pt content: 1.0% by weight) are slowly heated to 90° C. and held at this temperature for two hours. After cooling, volatile constituents are removed at 130° C. and a reduced pressure of 10 mbar to obtain an organopolysiloxane V(1-4) having a viscosity of 3617 mPas (measured at 25° C. and a shear rate of 1 l/s). Production of organopolysiloxane V(1-4) employs polysiloxane VA4 in a large excess and structural element (IV) where x=117 is therefore present to a predominant extent. The ratio of vinyl to Si—H is 2.61. The linear vinyldimethylsilyl-terminated polydimethylsiloxane (component (B)) has thus been incorporated by reaction to a predominant extent and is therefore likewise present in a minimal excess.

Production of the Comparative Examples V2a, V2b and V2c:

a) Production of an Organopolysiloxane (V2a) (Noninventive) Bridged Via the Structural Unit $O_{2/2}RSi-Y-SiR_2O_{1/2}$:

In a 1000 mL three-necked flask 24.5 g of an organosilicon compound having the composition $Me_3Si-(OSiMe_2)_{310}-(OSiHMe)_{14}-OSiMe_3$ (70% by weight solution in mineral oil) together with 482.1 g of an equilibrate of dimethylsiloxy and vinyldimethylsiloxy units having a vinyl content of 0.89 mol % and a trimethylsilyl-terminated polydimethylsiloxane having a viscosity of 200 mm²/s (25.0° C.; capillary no. IIc) were initially charged. The ratio of vinyl groups to Si—H groups is 6.5:1. 0.45 g of a solution of Karstedt's Pt catalyst in linear vinyldimethylsilyl-terminated polydimethylsiloxane (Pt content: 1.0% by weight) are added and the reaction mixture is slowly heated to 80° C. and held at this temperature for two hours. An organopolysiloxane V2a having a viscosity of 4280 mPas (measured at 25° C. and a shear rate of 25 l/s) is obtained after cooling.

Due to the ratio of vinyl groups to Si groups a large part of the employed equilibrate of dimethylsiloxy and vinyldimethylsiloxy units remains in unreacted form (as solvent). The mineral oil and also the trimethylsilyl-terminated polydimethylsiloxane furthermore have an inert solvent, thus preventing gelation.

b) Production of an Organopolysiloxane (V2b) Bridged Via the Structural Unit $O_{2/2}RSi-Y-SiR_2O_{1/2}$ According to EP 434 060 B2 (Noninventive):

In a 2 liter three-necked flask 7.3 g of an organosilicon compound having the composition $Me_3Si-(OSiMe_2)_4-(OSiHMe)_4-OSiMe_3$ are initially charged together with 900.0 g of an equilibrate of dimethylsiloxy and vinyldimethylsiloxy units having a vinyl content of 1.23 mol %. The ratio of vinyl groups to Si—H groups is 3.4:1. 0.28 g of a solution of Karstedt's Pt catalyst in linear vinyldimethylsilyl-terminated polydimethylsiloxane (Pt content: 1.0% by weight) are added and the reaction mixture is slowly heated to 80° C. and held at this temperature for one hour. An organopolysiloxanw V2b having a viscosity of 7000 mm²/s (25.0° C.; capillary no. IV) is obtained after cooling. Due to the ratio of vinyl groups to Si groups a large part of the employed equilibrate of dimethylsiloxy and vinyldimethylsiloxy units remains in unreacted form (as solvent), thus preventing gelation.

When the ratio of vinyl groups to Si—H groups is reduced to 3.0:1 (corresponds to 3.3 g of the above organosilicon compound having the composition $Me_3Si-(OSiMe_2)_4-(OSiHMe)_4-OSiMe_3$ and 362.1 g of the above equilibrate of dimethylsiloxy and vinyldimethylsiloxy units), the reaction under the recited conditions results in a gelled, no-longer-handleable product.

c) Production of an Organopolysiloxane (V2c) Bridged Via the Structural Unit $O_{2/2}RSi-Y-SiR_2O_{1/2}$ According to EP 217 501 A2 (Noninventive):

In a 1000 mL three-necked flask 163.9 g of a hydroxydimethylsilyl-terminated polydimethylsiloxane having a viscosity of 5790 mPas (measured at 25° C. and a shear rate of 25 l/s), 18.6 g of a silicon resin consisting of (as per $^{29}$Si-NMR and IR analysis) 40 mol % of $CH_3SiO_{1/2}$, 50 mol % of $SiO_{4/2}$, 8 mol % of $C_2H_5OSiO_{3/2}$ and 2 mol % of $HOSiO_{3/2}$ units and 544.2 g of a trimethylsilyl-terminated polydimethylsiloxane having a viscosity of 344 mm²/s (25.0° C.; capillary no. III) are initially charged. The reaction mixture is slowly heated to 80° C. and admixed with 1.24 g of an 80% by weight solution of KOH in methanol. The mixture is further heated to 100° C. and held at this temperature for three hours. Addition of 0.33 g of acetic acid (80%) and cooling affords an organopolysiloxane V2c having a viscosity of 1860 mm²/s (25.0° C.; capillary no. IIIc).

Since the product contains about 73% by weight of a trimethylsilyl-terminated polydimethylsiloxane as solvent, a still-flowable product is obtained.

Examples 3

Production of the Inventive Defoamer Formulations C1-C4 Comprising the Organopolysiloxanes(1) and Production of the Noninventive Defoamer Formulations VC5-VC9:

To produce the defoamer formulations the substances described in table 1 are mixed with a dissolver and heated to 150° C. for 4 hours in the presence of 1500 ppm of KOH (20% solution in methanol) and, after cooling, re-homogenized with the dissolver.

TABLE 1

Composition of the defoamer formulations

| Ex./Comp. | Component (1) Parts | Component (2) Parts | Component (3) Parts | Component (4) Parts | Components (5)/(6) Parts |
|---|---|---|---|---|---|
| C1 | 74.3 (1-1) | 5.0 D1 | 4.0 E1 | 16.0 F1 | 0.7 G1 |
| C2 | 74.3 (1-2) | 5.0 D1 | 4.0 E1 | 16.0 F1 | 0.7 G1 |
| C3 | 74.3 (1-3) | 5.0 D1 | 4.0 E1 | 16.0 F1 | 0.7 G1 |
| C4 | 74.3 (1-2) | 5.0 D1 | 4.0 E1 | 16.0 F1 | 0.7 G1 4.0 G2 |
| VC5 (noninventive) | 74.3 V(1-4) | 5.0 D1 | 4.0 E1 | 16.0 F1 | 0.7 G1 |
| VC6 [1] (noninventive) | 74.3 V2a | 5.0 D1 | 4.0 E1 | 16.0 F1 | 0.7 G1 |
| VC7 [2] (noninventive) | 82.4 V2b | 4.9 D1 | 4.9 E1 | 7.4 F1 | 0.4 G1 |
| VC8 [3] (noninventive) | — | 5.0 D1 | 4.0 E1 | 16.0 F1 64.3 F2 10.0 F3 | 0.7 G1 |
| VC9 [4] (noninventive) | 82.4 V2c | 4.9 D1 | 4.9 E1 | 7.4 F1 | 0.4 G1 |

[1] Comparative test VC6 according to EP 516 109 A1
[2] Comparative test VC7 according to EP 434 060 B2
[3] Comparative test VC8 according to WO 2011/069868 A2
[4] Comparative test VC9 according to EP 217 501 A2

Substances Used:

D1: A hydrophilic pyrogenic silica having a BET surface area of 300 m²/g (obtainable from Wacker Chemie AG, Germany under the trade name HDK® T30)

E1: A silicone resin which is solid at room temperature and consists of (as per $^{29}$Si-NMR and IR analysis) 40 mol % of $(CH_3)_3SiO_{1/2}$, 50 mol % of $SiO_{4/2}$, 8 mol % of $C_2H_5OSiO_{3/2}$ and 2 mol % of $HOSiO_{3/2}$ units having a weight-average molar mass of 7900 g/mol (based on polystyrene standard).

F1: A trimethylsiloxane-terminated polydimethylsiloxane having a viscosity of 0.0001 m²/s F2: A trimethylsiloxane-terminated polydimethylsiloxane having a viscosity of 0.008 m²/s F3: A trimethylsiloxane-terminated polydimethylsiloxane having a viscosity of 15.0 m²/s G1: A 20% methanolic solution of KOH, G2: A polyether-modified silicone copolymer of structure

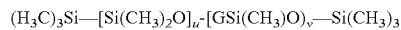

where $G=(CH_2)_3$—(O—$CH_2CH_2$)$_w$—(O—$CH(CH_3)$—$CH_2$)$_x$—OH, wherein u, v, w and x are chosen such that the polymer has a viscosity of 1100 mPa·s and a cloud point (according to DIN EN 1890) of 25° C.

Examples 4

Rheological Characterization of the Inventive Defoamer Formulations C1-C4 Comprising the Organopolysiloxanes (1) and the Noninventive Defoamer Formulations VC5-VC9:

Rheological characterization of the defoamer formulations is generally carried out under conditions as described in DIN 53019-4.

Characterization is in particular carried out with the aid of an oscillation measurement using a predetermined angular frequency in an Anton Paar air-mounted rotational rheometer (Rheometer MCR 301) connected to a thermostat (at a temperature of 25° C.). The measuring element employed is a cone/plate system having a diameter of 50 mm and an angle of 2° (Paar CP50-2 measuring cone). The sample volume of 1.6 mL is applied using a syringe. Measurement is carried out at a deformation of 1%. The angular frequency is logarithmically scanned from 100 rad/s to 1 rad/s and 11 data points DP (gradient=5 DP/decade) are recorded.

The evaluation is carried out automatically with software assistance (using the evaluation software RHEOPLUS32/Multi32 V3), wherein the loss factor (tan delta) (quotient of loss modulus and storage modulus) is determined at an angular frequency of 100 rad/s and the viscosity is determined at an angular frequency of 100 rad/s.

By contrast, the loss factor is considered over the entire frequency range between 1 rad/s and 100 rad/s and the difference between the maximum loss factor and the minimum loss factor is determined as Δ tan delta.

TABLE 2

Rheology of the defoamer formulations

| Ex./Comp. | Loss factor (tan delta) at 100 rad/s | Δ tan delta | Viscosity (mPas) at 100 rad/s |
|---|---|---|---|
| C1 | 1.83 | 0.23 | 6980 |
| C2 | 1.83 | 0.35 | 5060 |
| C3 | 1.73 | 0.08 | 5390 |
| C4 | 1.65 | 0.11 | 24890 |
| VC5 (noninventive) | 2.94 | 1.8 | 7560 |
| VC6 [1] (noninventive) | 3.01 | 2.0 | 2300 |
| VC7 [2] (noninventive) | 2.66 | 2.84 | 8700 |
| VC8 [3] (noninventive) | 1.76 | 2.72 | 40100 |
| VC9 [4] (noninventive) | 2.55 | 5.27 | 10200 |

[1] Comparative test VC6 according to EP 516 109 A1
[2] Comparative test VC7 according to EP 434 060 B2
[3] Comparative test VC8 according to WO 2011/069868 A2
[4] Comparative test VC9 according to EP 217 501 A2

The defoamer formulations C1 to C4 produced using the inventive organopolysiloxanes (1) show a lower loss factor (tan delta) which is also low over the entire frequency range considered.

This low loss factor is a consequence of the higher network junction density ensured by the chain length of the structural element (IV) where x<100.

At the same time all defoamer formulations show a very good flowability (low-viscosity) despite the use of a solvent being eschewed.

Thus, despite the low loss factor, the defoamer formulations may be handled as such and need not be converted into an emulsified form as in EP 0 499 364 A1 for example.

When the network junction density is lowered, as in the noninventive defoamer formulation VC5 (x=117), both the loss factor and the frequency dependence of the loss factor increase(Δ tan delta>1.5).

When the (noninventive) defoamer formulations VC6, VC7 and VC9 based on organopolysiloxanes produced in the presence of a high excess of the vinyl component (as solvent) or in the presence of a large amount of inert organopolysiloxane (in order that flowability is maintained) are considered, the influence on the loss factor is very markedly apparent. Particularly the frequency dependence of the loss factor (Δ tan delta) increases very markedly.

The (noninventive) defoamer formulation VC8, in which an elastic moment is to be achieved through use of an organopolysiloxane of very high viscosity, likewise exhibits the high frequency dependence of the loss factor.

Examples 5

Testing of Defoamer Performance of the Inventive Defoamer Formulations C1-C4 Comprising the Organopolysiloxanes (1) and the Noninventive Defoamer Formulations VC5-VC9 in Waste Black Liquor Defoaming:

The thus obtained inventive and noninventive defoamer formulations were examined in respect of the test in black liquor. The results of these tests are summarized in tables 3-6.

For better (more precise) dosing a mixture of 40 parts of the defoamer formulations recited in table 1 and 60 parts of a mixture of aliphatic hydrocarbons having a viscosity of 3 mm²/s and a flame point >100° C. were produced with a laboratory dissolver at 1000 rpm.

400 ml of waste black liquor from the chemical pulp process are recirculated at a recirculation rate of 1.5 l/min in a 1000 ml recirculation apparatus thermostatted to 80° C. As soon as the foam level has reached a height of 75 mm the defoamer is dosed in and the foam collapse time and the lowest foam level achieved after addition of defoamer and initiation of foam collapse are noted.

The shorter the foam collapse time t1 and the lower the foam level h1, the better the rapid response of a defoamer. This is followed by determination of the long-term performance of the defoamer, represented by the time interval t2 required to return from the lowest foam level to the original foam level (75 mm).

TABLE 3

Results of testing of defoamer performance on waste
black liquor from the chemical pulp process (hardwood
from UPM Kymmene Oy, Kuusankoski, Finland)

| Ex./Comp. | Foam collapse time t1 in [s] | Foam level after foam collapse [mm] | Long-term performance t2 in [s] |
|---|---|---|---|
| C1 | 20 | 19 | 895 |
| C2 | 17 | 18 | 919 |
| VC7 [1)] | 27 | 24 | 344 |

Dosing: 5 μl of the mixture of defoamer formulation and hydrocarbon mixture produced above
[1)] Comparative test VC7 according to EP 434 060 B2

In this test of defoaming of waste hardwood black liquor compared to the comparative formulation VC7 the inventive examples have a shorter foam collapse time at identical foam height and also better long-term performance than the formulations produced according to the prior art.

This superior defoamer activity is apparent both in example C1 and in C2; both defoamers exhibit a low loss factor (at 100 rad/s) and especially a virtually frequency-independent loss factor (Δ tan delta<1.5).

Comparative example VC7 having a Δ tan delta of 2.84 exhibits a markedly poorer defoamer performance, a result of using the vinyl component in excess.

TABLE 4

Results of testing of defoamer performance on waste
black liquor from the chemical pulp process (softwood
from UPM Kymmene Oy, Kuusankoski, Finland)

| Ex./Comp. | Foam collapse time t1 in [s] | Foam level after foam collapse [mm] | Long-term performance t2 in [s] |
|---|---|---|---|
| C1 | 10 | 23 | 368 |
| C3 | 14 | 22 | 338 |
| VC7 [1)] | 12 | 34 | 137 |

Dosing: 7.5 μl of the mixture of defoamer formulation and hydrocarbon mixture produced above
[1)] Comparative test VC7 according to EP 434 060 B2

The same picture is apparent in the defoaming of softwood waste black liquor. Here too, the inventive defoamers C1 and C3 have been found to be superior to the comparative example VC7 with a low loss factor (tan delta) and a low Δ tan delta.

TABLE 5

Results of testing of defoamer performance on a further
waste black liquor from the chemical pulp process (hardwood
from UPM Kymmene Oy, Kuusankoski, Finland)

| Ex./Comp. | Foam collapse time t1 in [s] | Foam level after foam collapse [mm] | Long-term performance t2 in [s] |
|---|---|---|---|
| VC5 | 21 | 23 | 438 |
| VC6 [1)] | 18 | 28 | 170 |
| VC7 [2)] | 19 | 27 | 234 |
| VC8 [3)] | 12 | 29 | 73 |
| C1 | 18 | 20 | 1212 |

Dosing: 3 μl of the mixture of defoamer formulation and hydrocarbon mixture produced above
[1)] Comparative test VC6 according to EP 516 109 A1
[2)] Comparative test VC7 according to EP 434 060 B2
[3)] Comparative test VC8 according to WO 2011/069868 A2

Two aspects are apparent from this test series.

Comparison between VC5 (noninventive) and C1 elucidates the influence of the density of junctions on the loss factor (tan delta) and on Δ tan delta (2.94 and 1.8 for VC5 where x=117 vs 1.83 and 0.23 for C1 where x=52). The higher density of junctions also results in a markedly better defoamer performance, in particular long-term performance.

Comparison between VC6, VC7 (both noninventive) and C1 shows the influence of solvent used/excess vinyl component used on the loss factor (tan delta) and on Δ tan delta:

C1 (no excess vinyl component):
tan delta=1.83; Δ tan delta=0.23,
VC6 (ratio of vinyl groups:Si—H groups=6.8:1 and use of the inert polysiloxane as solvent):
tan delta=3.01; Δ tan delta=2.0,
VC7 (ratio of vinyl groups:Si—H groups=3.4:1):
tan delta=2.66; Δ tan delta=2.84.

Here too, a markedly improved long-term defoamer performance is apparent.

Production of (Inventive) Emulsions F1 and F2 of the (Inventive) Defoamer Formulations C2 and C4 and of (Noninventive) Emulsions VF3 and VF4 of the (Noninventive) Defoamer Formulations VC7 and VC9:

To produce the emulsions F1 and F2 and also VF3 and VF4 (comparative examples), 15 parts of the defoamer formulation C2, C4, VC7 or VC9, 2 parts of sorbitan monostearate (commercially available from Croda under the name Span 60), 2 parts of polyoxyethylene(40) stearate (commercially available from Kolb under the name Sympatens-BS/400 G) and 3.2 parts of the polyether-modified silicone copolymers G2 are mixed at 70° C. 50 parts of a 1% aqueous solution of sodium carboxymethylcellulose (commercially available from Dow under the name Walocel CRT 30000) are stirred in with a paddle stirrer at 600 rpm. Within 3 minutes 27 parts of water were added portionwise and the mixture was stirred at 1000 rpm for a further 15 min.

TABLE 6

Results of testing of defoamer performance on waste
black liquor from the chemical pulp process (softwood
from UPM Kymmene Oy, Kuusankoski, Finland)

| Emulsions | Ex./Comp. | Foam collapse time t1 in [s] | Foam level after foam collapse [mm] | Long-term performance t2 in [s] |
|---|---|---|---|---|
| F1 | C2 | 13 | 15 | 341 |
| F2 | C4 | 19 | 18 | 543 |
| VF3 | VC7 [1)] | 20 | 14 | 143 |
| VF5 | VC9 [4)] | 22 | 20 | 281 |

Dosing: 5 μl of the produced emulsions
[1)] Comparative test VC7 according to EP 434 060 B2
[4)] Comparative test VC9 according to EP 217 501 A2

Formulation of the inventive defoamers as emulsions results in analogous results in the defoaming of waste softwood black liquors as for non-emulsified defoamers. Here too, the inventive defoamers F1 and F2 have been found to be superior to the comparative examples VF3 and VF5 with a low loss factor (tan delta) and a low Δ tan delta.

Examples 6

Testing of Defoamer Performance of the Inventive Defoamer Formulations C2 Comprising the Organopolysiloxanes (1-2) in Washing Composition Defoaming:
(Inventive) Pulverulent Defoamer Formulation F5:

In a glass beaker 56.3 g of sodium bicarbonate, 56.3 g of sodium sulfate and 15.0 g of a native cellulose, for example Arbocel UFC M8 (commercially available from Rettenmaier & Sohne) are initially charged and mixed with one another by intensive mixing with a paddle stirrer. 22.5 g of the defoamer formulation C2 are slowly added with intensive stirring. A white, free-flowing powder was obtained.

Testing of Defoamer Performance in a Washing Machine

A certain amount (see table 7) of defoamer formulation C2 or F5 was added to 130 g of a washing powder ECE-2 from WFK. The washing powder was then placed in a drum washing machine (Miele Novotronik W918 without Fuzzy Logic) together with 3500 g of clean cotton laundry. The washing program is then commenced. The program proceeds at a temperature of 40° C. and a water hardness of 3° GH. The foam height is recorded over a period of 55 minutes. The average foam score is determined from the foam scores ascertained over the entire duration (0% no foam measurable to 100% overfoaming). The lower the score, the higher the performance of the defoamer formulation over the entire duration.

TABLE 7

Defoamer performance of the defoamer formulations C2 and F5 in a washing machine:

| Defoamer formulation | Dosing per 100 g of washing powder | Average form score |
| --- | --- | --- |
| C2 | 0.15 g | 3% |
| F5 | 1.33 g | 5% |

The defoamer formulations C2 and F5 exhibit an excellent antifoam performance over the entire washing duration.

The invention claimed is:

1. A defoamer formulation, comprising:
  (1) at least one organopolysiloxane containing per molecule at least one structural unit of formula $$O_{1/2}R_2Si\text{---}Y\text{-}SiRO_{2/2} \quad (I)$$

at least 2 units of formula $$R^1R_2SiO_{1/2} \quad (II)$$

and units of formula $$R_2SiO_{2/2} \quad (III),$$

wherein
R each is identical or different and is a monovalent SiC-bonded hydrocarbon radical having
1 to 30 carbon atoms which optionally contains one or more nonadjacent O-atoms and which is free from aliphatic carbon-carbon multiple bonds and
$R^1$ each is identical or different and is R or an alkenyl radical having 2 to 30 carbon atoms, wherein at least one alkenyl radical per molecule is present,
Y each is an identical or different divalent hydrocarbon radical having 2 to 30 carbon atoms,
with the proviso that the at least one organopolysiloxane contains a structural element of formula $$R_2Y^2SiO\text{---}(SiR_2O)_{x1}\text{---}SiRY^1O\text{---}(SiR_2O)_{x2}\text{---}SiR_2R^1 \quad (IV),$$

wherein
R and $R^1$ are as defined above,
$Y^1$ is a divalent hydrocarbon radical having 2 to 30 carbon atoms which is bonded to a group having the formula $SiR_2O_{1/2}$,
$Y^2$ is a divalent hydrocarbon radical having 2 to 30 carbon atoms which is bonded to a group having the formula $SiRO_{2/2}$, and $x_1$ and $x_2$ are, independently, 0 or a positive integer, with the proviso that the sum of $x_1+x_2$ is x, wherein x is on average more than 5 and less than 100,
  (2) fillers, and
  (3) organopolysiloxane resins comprising units of formula $$R^2_e(R^3O)_fSiO_{(4-e-f)/2} \quad (V),$$

wherein
$R^2$ is identical or different and represents a hydrogen atom or a monovalent, optionally substituted, SiC-bonded hydrocarbon radical having 1 to 30 carbon atoms,
$R^3$ is identical or different and represents a hydrogen atom or a monovalent, optionally substituted hydrocarbon radical having 1 to 4 carbon atoms,
e is 0, 1, 2 or 3, and
f is 0, 1, 2, or 3,
with the proviso that the sum of e+f is not more than 3 and that the sum of e+f is 2 in less than 50% of all units of formula (V) in the organopolysiloxane resin.

2. The defoamer formulation of claim 1, wherein $R^1$ is a methyl or vinyl radical.

3. The defoamer formulation of claim 1, wherein x is on average more than 10 and less than 60.

4. The defoamer formulation of claim 1, wherein Y and $Y^1$ and $Y^2$ are each a radical of the formula —$CH_2CH_2$—.

5. The defoamer formulation of claim 1, wherein the organopolysiloxanes (1) are produced by reacting:
  (A) oligomeric or polymeric organosilicon compounds containing units of formula $$R^1R_2SiO_{1/2} \quad (II),$$

units of formula $$R_2SiO_{2/2} \quad (III),$$

and units of formula $$HRSiO_{2/2} \quad (VII),$$

with the proviso that
at least one alkenyl radical $R^1$ per molecule is present,
the sum of the units $HRSiO_{2/2}$ and $R^1R_2SiO_{1/2}$ is on average greater than 2.0, and the number of alkenyl radicals $R^1$ is on average greater than the number of Si-bonded hydrogen atoms
and optionally
  (B) oligomeric or polymeric organosilicon compounds containing units of formula $$R^6R_2SiO_{1/2} \quad (VIII), \text{ and}$$

units of formula $$R_2SiO_{2/2} (III),$$

wherein
$R^6$ is an alkenyl radical having 2 to 30 carbon atoms, in the presence of
  (C) catalysts which promote the addition of Si-bonded hydrogen onto aliphatic double bonds, wherein the ratio of aliphatic double bonds in the components (A) and optionally (B) to Si-bonded hydrogen in component (A) is 1.2 to 10.

6. The defoamer formulation of claim 5, wherein the ratio of aliphatic double bonds in the components (A) and optionally (B) to Si-bonded hydrogen in the component (A) is 1.5 to 5.0.

7. The defoamer formulation as claimed in claim 5, wherein the organosilicon compounds (A) have the formula $$R^1R_2SiO\text{-}(SiR_2O)_x\text{-}(HSiR)_y\text{---}O\text{-}SiR_2R^1 \quad (IX),$$

wherein
y is on average at least 0.5, and on average not more than 1.5,
with the proviso that at least one alkenyl radical $R^1$ per molecule is present,
the sum of the units $HRSiO_{2/2}$ and $R^1R_2SiO_{1/2}$ is on average greater than 2.0,
and the number of alkenyl radicals $R^1$ is on average greater than the number of Si-bonded hydrogen atoms.

8. The defoamer formulation as claimed in claim 5, wherein the organosilicon compounds (A) have the formula $$R^1R_2SiO\text{-}(SiR_2O)_x\text{-}(HSiR)_y\text{—}O\text{-}SiR_2R^1 \qquad (IX),$$

wherein
y is on average at least 0.6, and on average not more than 1.2,
with the proviso that at least one alkenyl radical $R^1$ per molecule is present,
the sum of the units $HRSiO_{2/2}$ and $R^1R_2SiO_{1/2}$ is on average greater than 2.0, and the number of alkenyl radicals $R^1$ is on average greater than the number of Si-bonded hydrogen.

9. The defoamer formulation of claim 5, wherein the organosilicon compounds (B) employed are those of formula $$R^6R_2SiO\text{—}(SiR_2O)_z\text{—}O\text{—}SiR_2R^6 \qquad (X),$$

wherein
R each is identical or different and is monovalent SiC-bonded hydrocarbon radical having 1 to 30 carbon atoms which optionally contain one or more nonadjacent O-atoms and which is free from aliphatic carbon-carbon multiple bonds and
$R^6$ is an alkenyl radical having 2 to 30 carbon atoms,
z is on average more than 5, preferably more than 10, and less than 1000, preferably less than 500, particularly preferably less than 250.

10. The defoamer formulation of claim 7, wherein the organosilicon compounds (B) employed are those of formula $$R^6R_2SiO\text{—}(SiR_2O)_z\text{—}O\text{—}SiR_2R^6 \qquad (X),$$

wherein
R each is identical or different and is monovalent SiC-bonded hydrocarbon radical having 1 to 30 carbon atoms which optionally contain one or more nonadjacent O-atoms and which is free from aliphatic carbon-carbon multiple bonds and
$R^6$ is an alkenyl radical having 2 to 30 carbon atoms,
z is on average more than 5, preferably more than 10, and less than 1000, preferably less than 500, particularly preferably less than 250.

11. The defoamer formulation of claim 1, further comprising one or more constituents (4) through (7);
(4) polyorganosiloxanes of formula $$R^4R_2SiO(SiR_2O)_mSiR_2R^4 \quad \text{or} \qquad (VIa)$$

$$R_2SiO\text{—}(SiR_2O)_n\text{—}SiR_2O \qquad (VIb)$$

wherein
$R^4$ each is identical or different and is R or $—OR^5$, wherein $R^5$ is a hydrogen atom or a monovalent, optionally substituted hydrocarbon radical having 1 to 25 carbon atoms, m is an integer from 1 to 2500,
n is an integer from 2 to 20,
wherein the polyorganosiloxanes may also contain small proportions of T units ($R^4SiO_{3/2}$) and/or Q units ($SiO_2$),
(5) water-insoluble organic compounds,
(6) polyether-modified polysiloxanes which are linear or branched and contain at least one polyether group,
and
(7) alkaline or acidic catalysts or their reaction products with one of the components (1) to (6).

12. The defoamer formulation of claim 1, wherein the defoamer formulation has a loss factor (tan delta) at 100 rad/s between 1.0 and 5.0, wherein over the frequency range of 1 to 100 rad/s the difference in the loss factor (Δ tan delta) is less than 1.5, and the defoamer has a viscosity at 100 rad/s between 1000 mPas and 300,000 mPas, in each case measured at 25° C., wherein the loss factor and the viscosity are determined according to DIN 53019-4.

13. The defoamer formulation of claim 1, wherein the defoamer formulation has a loss factor (tan delta) at 100 rad/s between 1.5 and 3.0, wherein over the frequency range of 1 to 100 rad/s the difference in the loss factor (Δ tan delta) is less than 1.0, and the defoamer has a viscosity at 100 rad/s between 2000 mPas and 100,000 mPas, in each case measured at 25° C., wherein the loss factor and the viscosity are determined according to DIN 53019-4.

14. The defoamer formulation, of claim 1, wherein the organopolysiloxane resins (3) are MQ resins comprising units of formulae $$SiO_2 \text{ (Q units) and}$$

$$R^2_3\ SiO_{1/2} \text{ (M units),}$$

wherein
the molar ratio of M units to Q units is in the range from 0.5 to 2.0, the MQ resins optionally also contain in addition to the M units and Q units, $R^2SiO_{3/2}$ or $(R^3O)SiO_{3/2}$ (T) units or $R^2_2\ SiO_{2/2}$ (D) units in amounts of 0.01 to 20 mol % based on the sum of all siloxane units, and the MQ resins may contain up to 10% by weight of free Si-bonded hydroxyl or alkoxy groups.

15. The defoamer formulation of claim 11, wherein the water-insoluble organic compounds (5) are those having a boiling point greater than 100° C. at 900 to 1100 hPa.

16. The defoamer formulation of claim 11, wherein the water-insoluble organic compounds (5) include one or more of mineral oils, native oils, isoparaffins, polyisobutylenes, residues from oxo alcohol synthesis, esters of low molecular weight synthetic carboxylic acids, for example pentanediol-1,3-diisobutyrate, fatty acid esters, octyl stearate, dodecyl palmitate or isopropyl myristate, fatty alcohols, ethers of low molecular weight alcohols, phthalates, esters of phosphoric acid and/or waxes.

17. The defoamer formulation of claim 11, wherein the defoamer formulation contains
(1) at least 30% by weight, and not more than 98% by weight, of organopolysiloxanes of claim 1,
(2) at least 1% by weight, and not more than 15% by weight, of fillers,
(3) at least 1% by weight, and not more than 15% by weight, of organopolysiloxane resins composed of units of formula (V),
(4) greater than 0% by weight and not more than 40% by weight of polyorganosiloxanes of formula (VIa) or (VIb), (5) greater than 0% by weight and not more than 15% by weight, of water-insoluble organic compounds,
(6) greater than 0% by weight and not more than 15% by weight, of polyether-modified polysiloxanes which are linear or branched and bear at least one polyether group and
(7) greater than 0% by weight, and not more than 1% by weight, of alkaline or acidic catalysts or their reaction products with one or more of components (1) to (6).

18. An emulsion of defoamer formulation(s) comprising at least one defoamer formulation of claim 1, emulsifiers, and water.

19. A powder, comprising:
at least one defoamer formulation of claim 1, and support materials.

20. A washing or cleaning composition containing a defoamer formulation of claim 1, or an emulsions thereof, or a powder thereof.

21. A process for defoaming and/or preventing foaming of liquid media, comprising:
mixing a defoamer formulation of claim 1, an emulsion thereof or a powder with the liquid media.

22. The process of claim 21, wherein the aqueous media comprises an aqueous medium generated in chemical pulp production.

* * * * *

UNITED STATES PATENT AND TRADEMARK OFFICE
CERTIFICATE OF CORRECTION

PATENT NO. : 10,870,071 B2
APPLICATION NO. : 16/330193
DATED : December 22, 2020
INVENTOR(S) : Christof Brehm et al.

Page 1 of 1

It is certified that error appears in the above-identified patent and that said Letters Patent is hereby corrected as shown below:

In the Claims

Column 28, Line 14, Claim 12:
After "difference in the loss factor"
Delete "(A tan delta)" and
Insert -- ($\Delta$ tan delta) --

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*